(12) United States Patent
Holmberg

(10) Patent No.: US 12,461,317 B2
(45) Date of Patent: *Nov. 4, 2025

(54) FIBER OPTIC ADAPTER BLOCK

(71) Applicant: CommScope Technologies LLC, Hickory, NC (US)

(72) Inventor: Matthew Holmberg, Le Center, MN (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/668,555

(22) Filed: May 20, 2024

(65) Prior Publication Data

US 2024/0402437 A1 Dec. 5, 2024

Related U.S. Application Data

(63) Continuation of application No. 18/182,543, filed on Mar. 13, 2023, now Pat. No. 11,988,877, which is a
(Continued)

(51) Int. Cl.
*G02B 6/38* (2006.01)
*G02B 6/44* (2006.01)

(52) U.S. Cl.
CPC ......... *G02B 6/3825* (2013.01); *G02B 6/3874* (2013.01); *G02B 6/3893* (2013.01);
(Continued)

(58) Field of Classification Search
CPC .. G02B 6/3825; G02B 6/3874; G02B 6/3893; G02B 6/3897; G02B 6/4452; G02B 6/44524; G02B 6/44528
See application file for complete search history.

(56) References Cited

U.S. PATENT DOCUMENTS 2,805,106 A 9/1957 Penkala
2,864,656 A 12/1958 Yorinks
(Continued)

FOREIGN PATENT DOCUMENTS

AU 4099585 A 10/1985
AU 5531486 A 10/1986
(Continued)

OTHER PUBLICATIONS

International Search Report and Written Opinion for PCT/US2013/021174 mailed Apr. 29, 2013.
(Continued)

*Primary Examiner* — Ryan A Lepisto
(74) *Attorney, Agent, or Firm* — Merchant & Gould P.C.

(57) ABSTRACT

A fiber optic adapter block is disclosed. The fiber optic adapter block includes at least three fiber optic adapters provided in a stacked arrangement extending widthwise in a longitudinal direction, wherein every other adapter of the at least three fiber optic adapters is staggered in a front to back direction with respect to an adjacent adapter such that front ends of the every other adapter of the at least three fiber optic adapters are aligned at a first depth and a front end of the adjacent adapter is at a second depth that is different than the first depth.

18 Claims, 9 Drawing Sheets

Related U.S. Application Data continuation of application No. 17/589,389, filed on Jan. 31, 2022, now Pat. No. 11,604,317, which is a continuation of application No. 17/136,678, filed on Dec. 29, 2020, now Pat. No. 11,262,508, which is a continuation of application No. 16/370,253, filed on Mar. 29, 2019, now Pat. No. 10,884,194, which is a continuation of application No. 15/721,169, filed on Sep. 29, 2017, now Pat. No. 10,247,887, which is a continuation of application No. 15/243,021, filed on Aug. 22, 2016, now Pat. No. 9,784,923, which is a continuation of application No. 14/737,804, filed on Jun. 12, 2015, now Pat. No. 9,429,714, which is a continuation of application No. 13/737,689, filed on Jan. 9, 2013, now Pat. No. 9,075,203.

(60) Provisional application No. 61/704,288, filed on Sep. 21, 2012, provisional application No. 61/587,245, filed on Jan. 17, 2012.

(52) U.S. Cl.
CPC ......... *G02B 6/3897* (2013.01); *G02B 6/4452* (2013.01); G02B 6/44524 (2023.05); G02B 6/44528 (2023.05)

(56) References Cited

U.S. PATENT DOCUMENTS

| | | |
|---|---|---|
| 3,901,564 A | 8/1975 | Armstrong |
| 4,070,076 A | 1/1978 | Zwillinger |
| 4,172,625 A | 10/1979 | Swain |
| 4,320,934 A | 3/1982 | Erich et al. |
| 4,359,262 A | 11/1982 | Dolan |
| 4,373,776 A | 2/1983 | Purdy |
| 4,494,806 A | 1/1985 | Williams et al. |
| 4,502,754 A | 3/1985 | Kawa |
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,737,039 A | 4/1988 | Sekerich |
| 4,765,710 A | 8/1988 | Burmeister et al. |
| 4,792,203 A | 12/1988 | Nelson et al. |
| 4,820,007 A | 4/1989 | Ross et al. |
| 4,840,449 A | 6/1989 | Ghandeharizadeh |
| 4,898,448 A | 2/1990 | Cooper |
| 4,971,421 A | 11/1990 | Ori |
| 4,986,762 A | 1/1991 | Keith |
| 4,995,688 A | 2/1991 | Anton et al. |
| 5,024,498 A | 6/1991 | Becker et al. |
| 5,066,149 A | 11/1991 | Wheeler et al. |
| 5,067,678 A | 11/1991 | Henneberger et al. |
| 5,071,211 A | 12/1991 | Debortoli et al. |
| 5,100,221 A | 3/1992 | Carney et al. |
| 5,127,082 A | 6/1992 | Below et al. |
| 5,129,030 A | 7/1992 | Petrunia |
| 5,138,688 A | 8/1992 | Debortoli |
| 5,142,606 A | 8/1992 | Carney et al. |
| 5,142,607 A | 8/1992 | Petrotta et al. |
| 5,167,001 A | 11/1992 | Debortoli et al. |
| 5,174,675 A | 12/1992 | Martin |
| 5,240,209 A | 8/1993 | Kutsch |
| 5,247,603 A | 9/1993 | Vidacovich et al. |
| 5,275,064 A | 1/1994 | Hobbs |
| 5,285,515 A | 2/1994 | Milanowski et al. |
| 5,289,558 A | 2/1994 | Teichler et al. |
| 5,316,243 A | 5/1994 | Henneberger |
| 5,317,663 A | 5/1994 | Beard et al. |
| 5,323,480 A | 6/1994 | Mullaney et al. |
| 5,335,349 A | 8/1994 | Kutsch et al. |
| 5,339,379 A | 8/1994 | Kutsch et al. |
| 5,353,367 A | 10/1994 | Czosnowski et al. |
| 5,363,466 A | 11/1994 | Milanowski et al. |
| 5,363,467 A | 11/1994 | Keith |
| 5,402,515 A | 3/1995 | Vidacovich et al. |
| 5,412,751 A | 5/1995 | Siemon et al. |
| 5,430,823 A | 7/1995 | Dupont et al. |
| 5,438,641 A | 8/1995 | Malacarne |
| 5,490,229 A | 2/1996 | Ghandeharizadeh et al. |
| 5,497,444 A | 3/1996 | Wheeler |
| 5,509,096 A | 4/1996 | Easley |
| 5,511,144 A | 4/1996 | Hawkins et al. |
| 5,530,783 A | 6/1996 | Belopolsky et al. |
| 5,570,450 A | 10/1996 | Fernandez et al. |
| 5,613,030 A | 3/1997 | Hoffer et al. |
| 5,640,481 A | 6/1997 | Llewellyn et al. |
| 5,647,043 A | 7/1997 | Anderson et al. |
| 5,655,044 A | 8/1997 | Finzel et al. |
| 5,717,810 A | 2/1998 | Wheeler |
| 5,724,469 A | 3/1998 | Orlando |
| 5,802,237 A | 9/1998 | Pulido |
| 5,811,055 A | 9/1998 | Geiger |
| 5,836,148 A | 11/1998 | Fukao |
| 5,882,100 A | 3/1999 | Erich |
| 5,887,106 A | 3/1999 | Cheeseman et al. |
| 5,917,984 A | 6/1999 | Volker et al. |
| 5,923,753 A | 7/1999 | Haataja et al. |
| 5,946,440 A | 8/1999 | Puetz |
| 5,966,492 A | 10/1999 | Bechamps et al. |
| 5,971,626 A | 10/1999 | Knodell et al. |
| 5,975,769 A | 11/1999 | Larson et al. |
| 5,978,540 A | 11/1999 | Bechamps et al. |
| 6,009,224 A | 12/1999 | Allen |
| 6,022,150 A | 2/2000 | Erdman et al. |
| 6,027,252 A | 2/2000 | Erdman et al. |
| 6,044,194 A | 3/2000 | Meyerhoefer |
| 6,076,908 A | 6/2000 | Maffeo |
| 6,215,938 B1 | 4/2001 | Reitmeier et al. |
| 6,226,436 B1 | 5/2001 | Daoud et al. |
| 6,236,795 B1 | 5/2001 | Rodgers |
| 6,269,214 B1 | 7/2001 | Naudin et al. |
| 6,301,424 B1 | 10/2001 | Hwang |
| 6,360,050 B1 | 3/2002 | Moua et al. |
| 6,364,534 B1 | 4/2002 | Lampert |
| 6,438,310 B1 | 8/2002 | Lance et al. |
| 6,439,523 B1 | 8/2002 | Chandler et al. |
| 6,496,638 B1 | 12/2002 | Andersen |
| 6,504,988 B1 | 1/2003 | Trebesch et al. |
| 6,591,051 B2 | 7/2003 | Solheid et al. |
| 6,594,434 B1 | 7/2003 | Davidson et al. |
| 6,600,866 B2 | 7/2003 | Gatica et al. |
| RE38,311 E | 11/2003 | Wheeler |
| 6,652,155 B2 | 11/2003 | Lampert |
| 6,672,898 B2 | 1/2004 | Kahle et al. |
| 6,677,520 B1 | 1/2004 | Kim et al. |
| 6,715,619 B2 | 4/2004 | Kim et al. |
| 6,748,155 B2 | 6/2004 | Kim et al. |
| 6,768,860 B2 | 7/2004 | Liberty |
| 6,804,447 B2 | 10/2004 | Smith et al. |
| 6,809,258 B1 | 10/2004 | Dang et al. |
| 6,810,193 B1 | 10/2004 | Mller |
| 6,845,208 B2 | 1/2005 | Thibault et al. |
| 6,865,331 B2 | 3/2005 | Mertesdorf |
| 6,925,241 B2 | 8/2005 | Bohle et al. |
| 6,934,457 B2 | 8/2005 | Vincent et al. |
| 6,945,620 B2 | 9/2005 | Lam et al. |
| 6,968,111 B2 | 11/2005 | Trebesch et al. |
| 7,006,748 B2 | 2/2006 | Dagley et al. |
| 7,068,907 B2 | 6/2006 | Schray |
| 7,079,744 B2 | 7/2006 | Douglas et al. |
| 7,116,777 B2 | 10/2006 | Knudsen et al. |
| 7,120,348 B2 | 10/2006 | Trebesch et al. |
| 7,171,099 B2 | 1/2007 | Barnes et al. |
| 7,302,153 B2 | 11/2007 | Thom |
| 7,302,154 B2 | 11/2007 | Trebesch et al. |
| 7,308,184 B2 | 12/2007 | Barnes et al. |
| 7,367,823 B2 | 5/2008 | Rapp et al. |
| 7,373,071 B2 | 5/2008 | Douglas et al. |
| 7,400,813 B2 | 7/2008 | Zimmel |

(56) References Cited

U.S. PATENT DOCUMENTS

| | | | |
|---|---|---|---|
| 7,406,240 B2 | 7/2008 | Murano | |
| 7,409,137 B1 | 8/2008 | Barnes | |
| 7,416,349 B2 | 8/2008 | Kramer | |
| 7,460,757 B2 | 12/2008 | Hoehne et al. | |
| 7,463,811 B2 | 12/2008 | Trebesch et al. | |
| 7,496,268 B2 | 2/2009 | Escoto et al. | |
| 7,499,623 B2 | 3/2009 | Barnes et al. | |
| 7,664,361 B2 | 2/2010 | Trebesch et al. | |
| 7,689,089 B2 | 3/2010 | Wagner et al. | |
| 7,706,656 B2 | 4/2010 | Zimmel | |
| 7,715,681 B2 | 5/2010 | Krampotich et al. | |
| 7,747,125 B1 | 6/2010 | Lee et al. | |
| RE41,460 E | 7/2010 | Wheeler | |
| 7,751,674 B2 | 7/2010 | Hill | |
| 7,764,859 B2 | 7/2010 | Krampotich et al. | |
| 7,856,166 B2 | 12/2010 | Biribuze et al. | |
| 7,869,683 B2 | 1/2011 | Barnes et al. | |
| 7,876,993 B2 | 1/2011 | Krampotich et al. | |
| 7,889,961 B2 | 2/2011 | Cote et al. | |
| 8,027,558 B2 | 9/2011 | Barnes et al. | |
| 8,059,932 B2 | 11/2011 | Hill et al. | |
| 8,078,030 B2 | 12/2011 | Trebesch et al. | |
| 8,195,022 B2 | 6/2012 | Coburn et al. | |
| 8,270,796 B2 | 9/2012 | Nhep | |
| 8,285,104 B2 | 10/2012 | Davis et al. | |
| 8,406,597 B2 | 3/2013 | Case | |
| 8,452,149 B2 | 5/2013 | Krampotich et al. | |
| 8,559,785 B2 | 10/2013 | Barlowe et al. | |
| 8,600,208 B2 | 12/2013 | Badar et al. | |
| 8,639,081 B2 | 1/2014 | Barnes et al. | |
| 8,655,136 B2 | 2/2014 | Trebesch et al. | |
| 8,690,593 B2 | 4/2014 | Anderson et al. | |
| 9,075,203 B2 * | 7/2015 | Holmberg | G02B 6/3897 |
| 9,429,714 B2 * | 8/2016 | Holmberg | G02B 6/3897 |
| 9,784,923 B2 * | 10/2017 | Holmberg | G02B 6/3874 |
| 9,885,845 B2 | 2/2018 | Case | |
| 10,247,887 B2 * | 4/2019 | Holmberg | G02B 6/3825 |
| 10,884,194 B2 * | 1/2021 | Holmberg | G02B 6/3897 |
| 11,262,508 B2 * | 3/2022 | Holmberg | G02B 6/4452 |
| 11,604,317 B2 * | 3/2023 | Holmberg | G02B 6/3893 |
| 11,988,877 B2 * | 5/2024 | Holmberg | G02B 6/3893 |
| 2001/0001270 A1 | 5/2001 | Williams Vigliaturo | |
| 2002/0166226 A1 | 11/2002 | Matsuura | |
| 2002/0181922 A1 | 12/2002 | Xin et al. | |
| 2003/0128951 A1 | 7/2003 | Lecomte et al. | |
| 2003/0174996 A1 | 9/2003 | Henschel et al. | |
| 2004/0175090 A1 | 9/2004 | Vastmans et al. | |
| 2005/0078929 A1 | 4/2005 | Iwanek | |
| 2005/0100301 A1 | 5/2005 | Solheid et al. | |
| 2005/0123261 A1 | 6/2005 | Bellekens et al. | |
| 2006/0275008 A1 | 12/2006 | Xin | |
| 2007/0003204 A1 | 1/2007 | Makrides-Saravanos et al. | |
| 2007/0025675 A1 | 2/2007 | Kramer | |
| 2007/0036503 A1 | 2/2007 | Solheid et al. | |
| 2008/0175550 A1 | 7/2008 | Coburn et al. | |
| 2009/0047800 A1 | 2/2009 | Tabet | |
| 2009/0067800 A1 | 3/2009 | Vazquez et al. | |
| 2009/0067802 A1 | 3/2009 | Hoehne et al. | |
| 2009/0274431 A1 | 11/2009 | Krampotich et al. | |
| 2010/0054668 A1 | 3/2010 | Nelson | |
| 2010/0129028 A1 | 5/2010 | Nhep et al. | |
| 2010/0142910 A1 | 6/2010 | Hill et al. | |
| 2010/0158465 A1 | 6/2010 | Smrha | |
| 2010/0266253 A1 | 10/2010 | Krampotich et al. | |
| 2010/0316346 A1 | 12/2010 | Krampotich et al. | |
| 2010/0322578 A1 | 12/2010 | Cooke et al. | |
| 2011/0188809 A1 | 8/2011 | LeBlanc et al. | |
| 2011/0211799 A1 | 9/2011 | Conner et al. | |
| 2011/0217016 A1 | 9/2011 | Mullsteff | |
| 2011/0222819 A1 | 9/2011 | Anderson et al. | |
| 2011/0235979 A1 | 9/2011 | Anderson et al. | |
| 2011/0267794 A1 | 11/2011 | Anderson et al. | |
| 2011/0268404 A1 | 11/2011 | Cote et al. | |
| 2011/0268408 A1 | 11/2011 | Giraud et al. | |
| 2011/0268410 A1 | 11/2011 | Giraud et al. | |
| 2011/0268412 A1 | 11/2011 | Giraud et al. | |
| 2011/0286712 A1 | 11/2011 | Puetz et al. | |
| 2011/0317974 A1 | 12/2011 | Krampotich et al. | |
| 2012/0057838 A1 | 3/2012 | Hill et al. | |
| 2013/0089292 A1 | 4/2013 | Ott et al. | |
| 2013/0089298 A1 | 4/2013 | Holmberg et al. | |
| 2013/0287356 A1 | 10/2013 | Solheid et al. | |
| 2014/0086545 A1 | 3/2014 | Solheid et al. | |
| 2014/0133819 A1 | 5/2014 | Trebesch et al. | |

FOREIGN PATENT DOCUMENTS

| | | |
|---|---|---|
| CN | 1531663 | 9/2004 |
| CN | 101238400 A | 8/2008 |
| CN | 101650457 | 2/2010 |
| DE | 2735106 A1 | 2/1979 |
| DE | 2918309 A1 | 11/1980 |
| DE | 2918309 C2 | 11/1982 |
| DE | 2735106 C2 | 9/1983 |
| DE | 3308682 A1 | 9/1984 |
| DE | 3308682 C2 | 12/1985 |
| DE | 3836273 A1 | 4/1990 |
| DE | 4413136 C1 | 5/1995 |
| DE | 29504191 U1 | 5/1996 |
| DE | 3836273 C2 | 5/1997 |
| EP | 146478 A2 | 6/1985 |
| EP | 149250 A2 | 7/1985 |
| EP | 146478 A3 | 8/1985 |
| EP | 149250 A3 | 8/1985 |
| EP | 196102 A2 | 10/1986 |
| EP | 149250 B1 | 8/1987 |
| EP | 196102 A3 | 6/1989 |
| EP | 356942 A2 | 3/1990 |
| EP | 406151 A2 | 1/1991 |
| EP | 356942 A3 | 3/1991 |
| EP | 406151 A3 | 9/1991 |
| EP | 464570 A1 | 1/1992 |
| EP | 479226 A1 | 4/1992 |
| EP | 196102 B1 | 3/1993 |
| EP | 538164 A1 | 4/1993 |
| EP | 563995 A1 | 10/1993 |
| EP | 356942 B1 | 1/1995 |
| EP | 464570 B1 | 9/1995 |
| EP | 479226 B1 | 3/1997 |
| EP | 538164 B1 | 3/1997 |
| EP | 563995 B1 | 10/1999 |
| FR | 2531576 A1 | 2/1984 |
| FR | 2531576 B1 | 1/1985 |
| FR | 2587127 A1 | 3/1987 |
| FR | 2587127 B1 | 10/1987 |
| FR | 2678076 A1 | 12/1992 |
| FR | 2678076 B1 | 9/1994 |
| JP | 59074523 A | 4/1984 |
| JP | 60169811 A | 9/1985 |
| JP | 61055607 A | 3/1986 |
| JP | 61090104 A | 5/1986 |
| JP | 2002082256 | 3/2002 |
| JP | 2003224373 | 8/2003 |
| KR | 200337929 Y1 | 1/2004 |
| KR | 1020080033420 | 4/2008 |
| WO | 9110927 | 7/1991 |
| WO | 9507480 | 3/1995 |
| WO | 9610203 | 4/1996 |
| WO | 9900619 | 1/1999 |
| WO | 03005095 | 1/2003 |
| WO | 03067297 | 8/2003 |
| WO | 2007021533 | 2/2007 |
| WO | 2007021533 A2 | 2/2007 |

OTHER PUBLICATIONS

"ITU Fiber Handbook" with English translation, 14 pages, Mar. 1992.
"Precision Mechanical" with English translation, 5 pages.
Northern Telecom Bulletin #91-004, Issue #2, May 1991.
AT&T Product Bulletin 2987D-DLH-7/89, "High Density Interconnect System (HDIC)," Issue 2 (Copyright 1989).

(56) References Cited

OTHER PUBLICATIONS

Preface to the book "Structure, Installation, Connection and Protection of Communication Optical Fiber Cable," in Chinese with English Translation, 14 pages (Mar. 1992).

Complaint relating to Civil Action No. 5:11-cv-02509-JS, *ADC Telecommunications, Inc* v. *Opterna Am, Inc.* filed Apr. 11, 2011 (14 pages).

Complaint relating to Civil Action No. 1:11cv-735 (GBL-IDD), *ADC Telecommunications, Inc* v. *Opterna Am, Inc.* filed Jul. 12, 2011 (5 pages).

Plaintiff's Notice of Dismissal relating to Civil Action No. 5:11-cv-02509-JS, *ADC Telecommunications, Inc* v. *Opterna Am, Inc.* filed Jul. 12, 2011 (1 page).

Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).

Extended European Search Report for Application No. 18174899.7 mailed Oct. 30, 2018.

\* cited by examiner

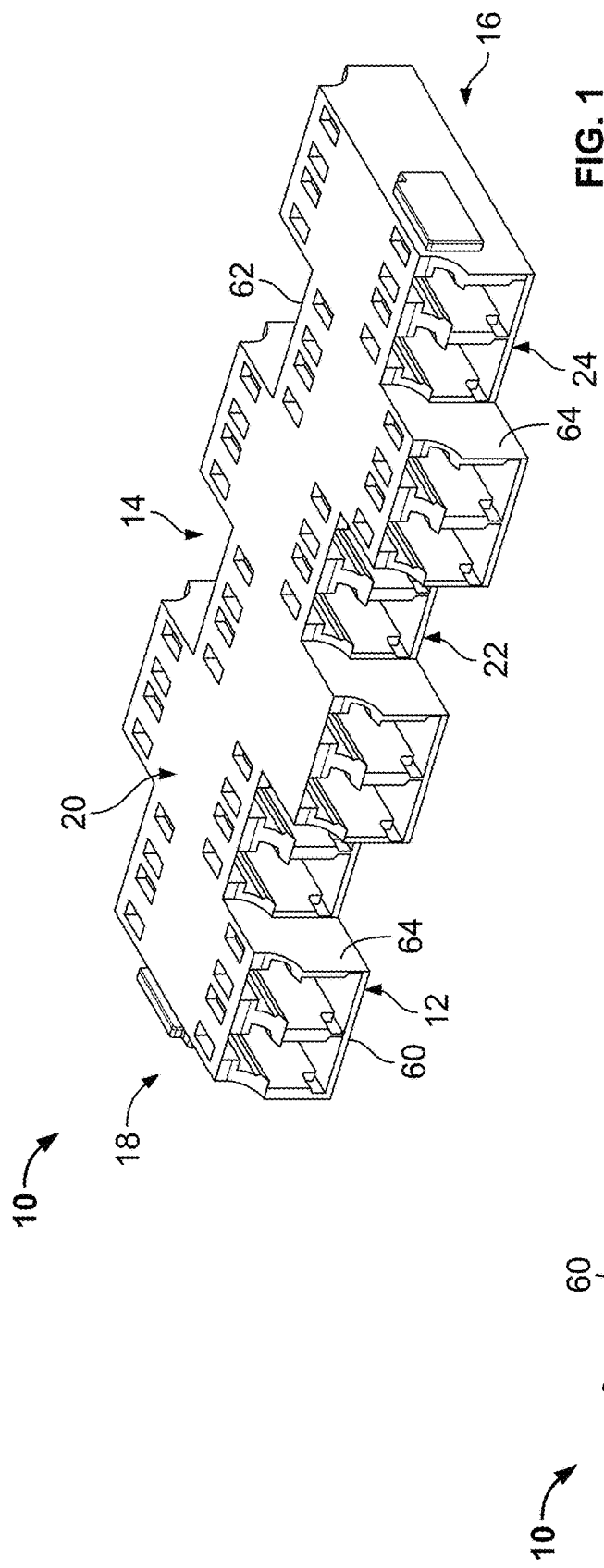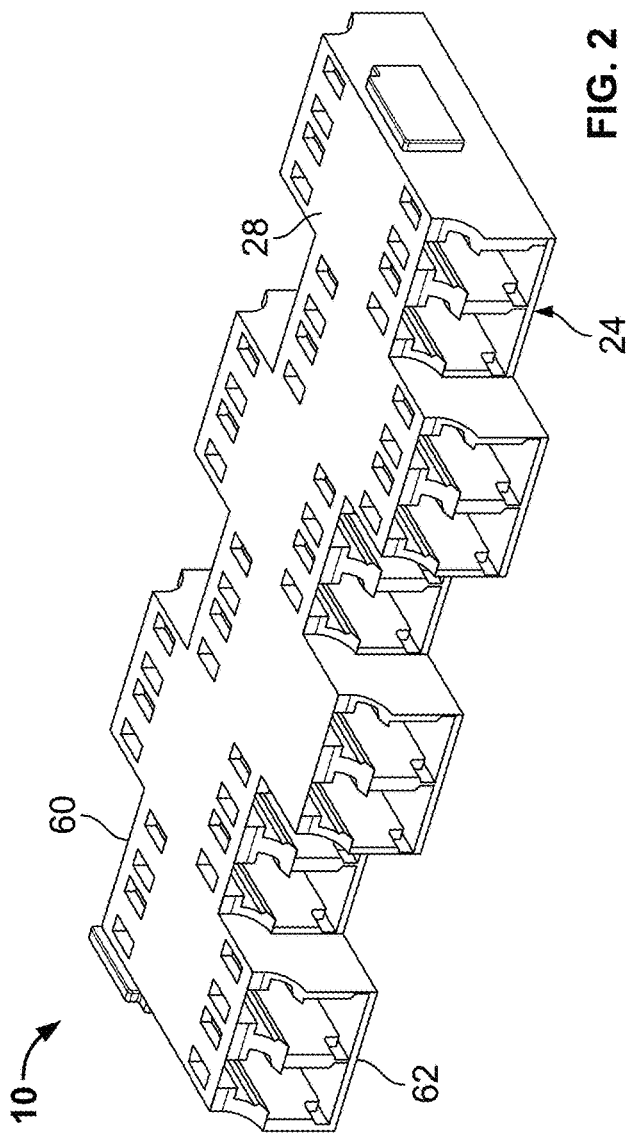

FIBER OPTIC ADAPTER BLOCK

CROSS REFERENCE TO RELATED APPLICATIONS

The present application is a continuation of U.S. application Ser. No. 18/182,543, filed Mar. 13, 2023, now U.S. Pat. No. 11,988,877; which is a continuation of U.S. application Ser. No. 17/589,389, filed Jan. 31, 2022, now U.S. Pat. No. 11,604,317; which is a continuation of U.S. application Ser. No. 17/136,678, filed Dec. 29, 2020, now U.S. Pat. No. 11,262,508; which is a continuation of U.S. application Ser. No. 16/370,253, filed Mar. 29, 2019, now U.S. Pat. No. 10,884,194; which is a continuation of U.S. application Ser. No. 15/721,169, filed Sep. 29, 2017, now U.S. Pat. No. 10,247,887; which is a continuation of U.S. application Ser. No. 15/243,021, filed Aug. 22, 2016, now U.S. Pat. No. 9,784,923; which is a continuation of U.S. application Ser. No. 14/737,804, filed Jun. 12, 2015, now U.S. Pat. No. 9,429,714; which is a continuation of U.S. application Ser. No. 13/737,689, filed Jan. 9, 2013, now U.S. Pat. No. 9,075,203; which claims priority to U.S. Provisional Application No. 61/587,245, filed Jan. 17, 2012 and U.S. Provisional Application No. 61/704,288, filed Sep. 21, 2012. The disclosures of these applications are hereby incorporated by reference in their entireties.

FIELD

The present disclosure relates generally to fiber optic telecommunications equipment. More specifically, the present disclosure relates to a fiber optic adapter block designed for high density applications.

BACKGROUND

As demand for telecommunications increases, fiber optic networks are being extended in more and more areas. Management of the cables, ease of installation, and ease of accessibility for later management are important concerns. As a result, there is a need for fiber optic devices and methods which address these and other concerns.

SUMMARY

The present invention relates to a fiber optic telecommunications device. The telecommunications device is a fiber optic adapter block.

According to one aspect of the disclosure, fiber optic adapters are arranged in a staggered alternating arrangement to facilitate improved connector access. Small form factor connectors particularly benefit from such a construction. Examples include LC and LX.5.

According to one example embodiment, the adapter block defines a generally one-piece molded body that defines a plurality of integrally formed adapters for optically connecting fiber optic cables terminated with connectors.

According to another embodiment, the adapter block defines a plurality of adapters provided in a stacked arrangement in a longitudinal direction, such as from a right side to a left side of the adapter block, wherein every other adapter of the block of adapters is staggered in a transverse direction, such as in a front to back direction with respect to an adjacent adapter.

According to another aspect, the fiber optic adapter block includes at least three fiber optic adapters provided in a stacked arrangement extending widthwise from a right to left direction on the block, wherein every other adapter of the at least three fiber optic adapters is staggered in a front to back direction with respect to an adjacent adapter such that front ends of the every other adapter of the at least three fiber optic adapters are aligned at a first depth and a front end of the adjacent adapter is at a second depth that is different than the first depth.

The adapter block can be arranged in a variety of orientations. The adapter block can be incorporated into a variety of telecommunications equipment, including fixtures, panels, frames, drawers, and chassis. The adapter block can be stationarily mounted, or mounted for movement on a pivoting element, and/or on a sliding element.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 1 is a front perspective view of an adapter block having features that are examples of inventive aspects in accordance with the present disclosure.

FIG. 2 is a rear perspective view of the adapter block of FIG. 1.

DETAILED DESCRIPTION

Figure 3:
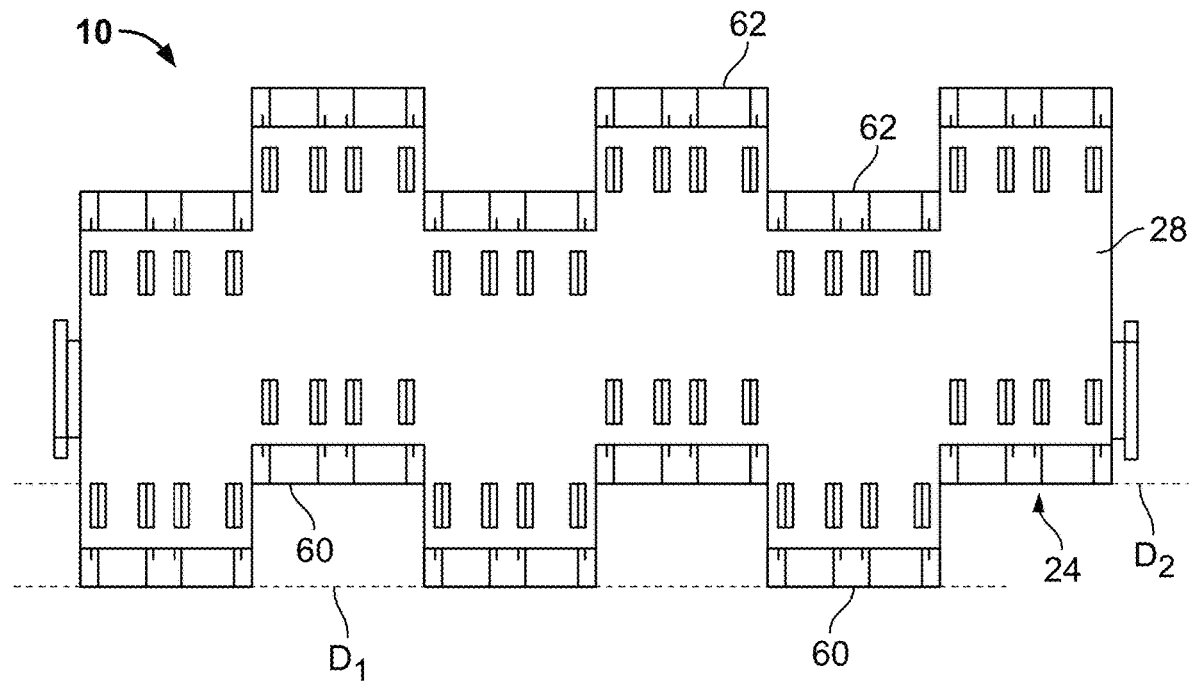
FIG. 3 is a top view of the adapter block of FIG. 1.
Figure 4:
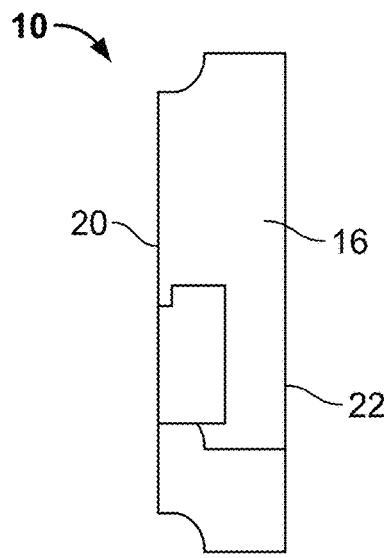
FIG. 4 is a right side view of the adapter block of FIG. 1.
Figure 5:
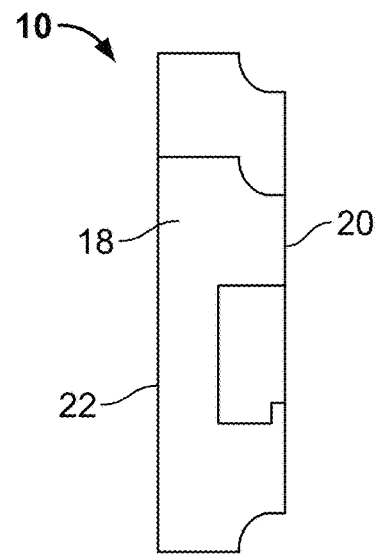
FIG. 5 is a left side view of the adapter block of FIG. 1.
Figure 6:
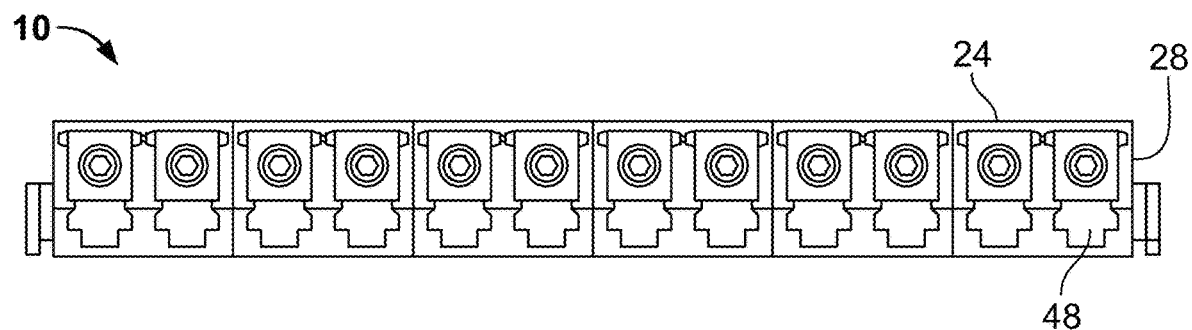
FIG. 6 is a front view of the adapter block of FIG. 1.
Figure 7:
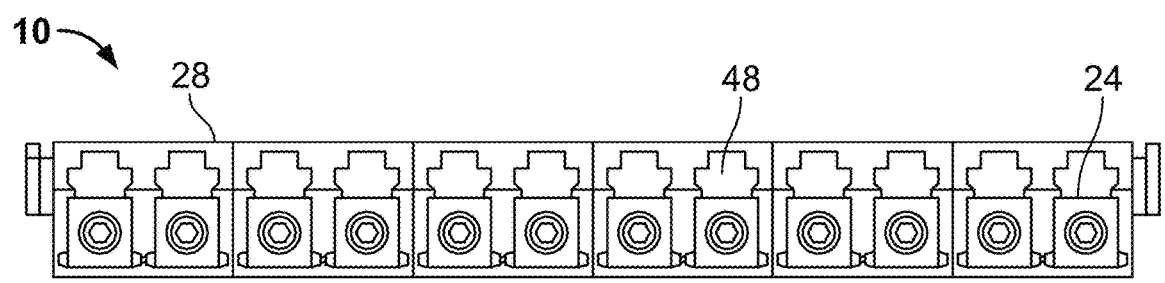
FIG. 7 is a rear view of the adapter block of FIG. 1.

Reference will now be made in detail to examples of inventive aspects of the present disclosure which are illustrated in the accompanying drawings. Wherever possible, the same reference numbers will be used throughout the drawings to refer to the same or like parts.

Referring to FIGS. 1-7, a fiber optic adapter block 10 having features that are examples of inventive aspects in accordance with the present disclosure are illustrated. The fiber optic adapter block 10 defines a front end 12, a rear end 14, a right side 16, a left side 18, a top side 20, and a bottom side 22. In the depicted embodiment, the fiber optic adapter block 10 defines a plurality of fiber optic adapters 24 having an LC footprint that are configured to optically connect a pair of LC style fiber optic connectors 26. In the depicted embodiment, the adapter block 10 defines a generally one-piece unitary molded body 28, wherein the plurality of adapters 24 are integrally formed with the one-piece body 28. According to one example embodiment, the body 28 and the integrally formed adapters 24 may be molded from a polymeric material. In the depicted embodiment, the block 24 defines six LC-type duplex adapters 24 extending widthwise from the right side 16 to the left side 18 of the body 28 for a total of twelve possible connections.

As will be discussed in further detail below, the adapter block 10 is molded such that every other duplex adapter 24 is staggered in a front to back direction with respect to an adjacent adapter as the adapters 24 extend from the right side 16 to the left side 18 of the block 10. The staggering preferably alternates from the right side to the left side.

Figure 8:
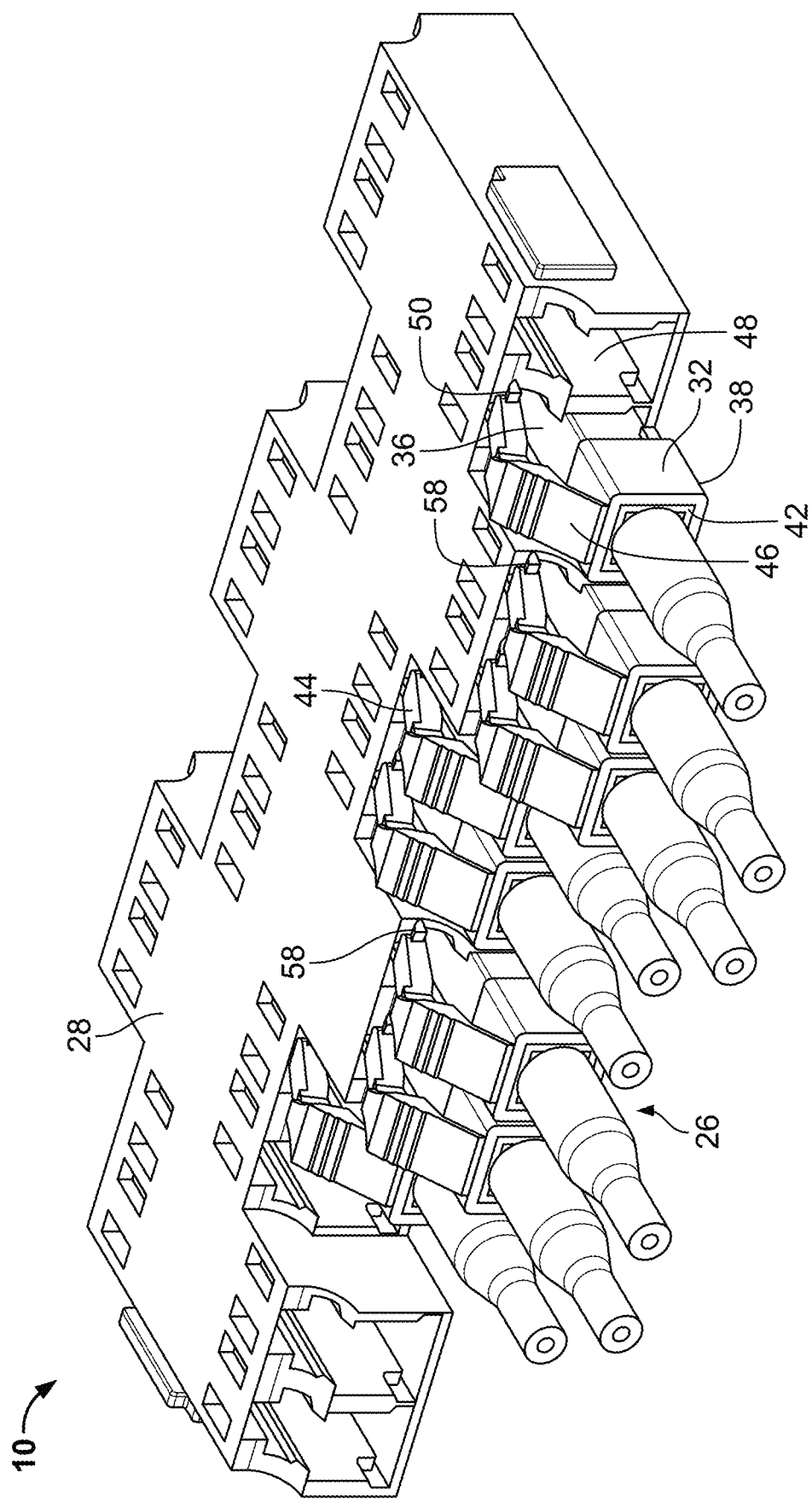
FIG. 8 illustrates the front perspective view of the adapter block of FIG. 1 with a number of fiber optic connectors mounted thereon.
Figure 9:
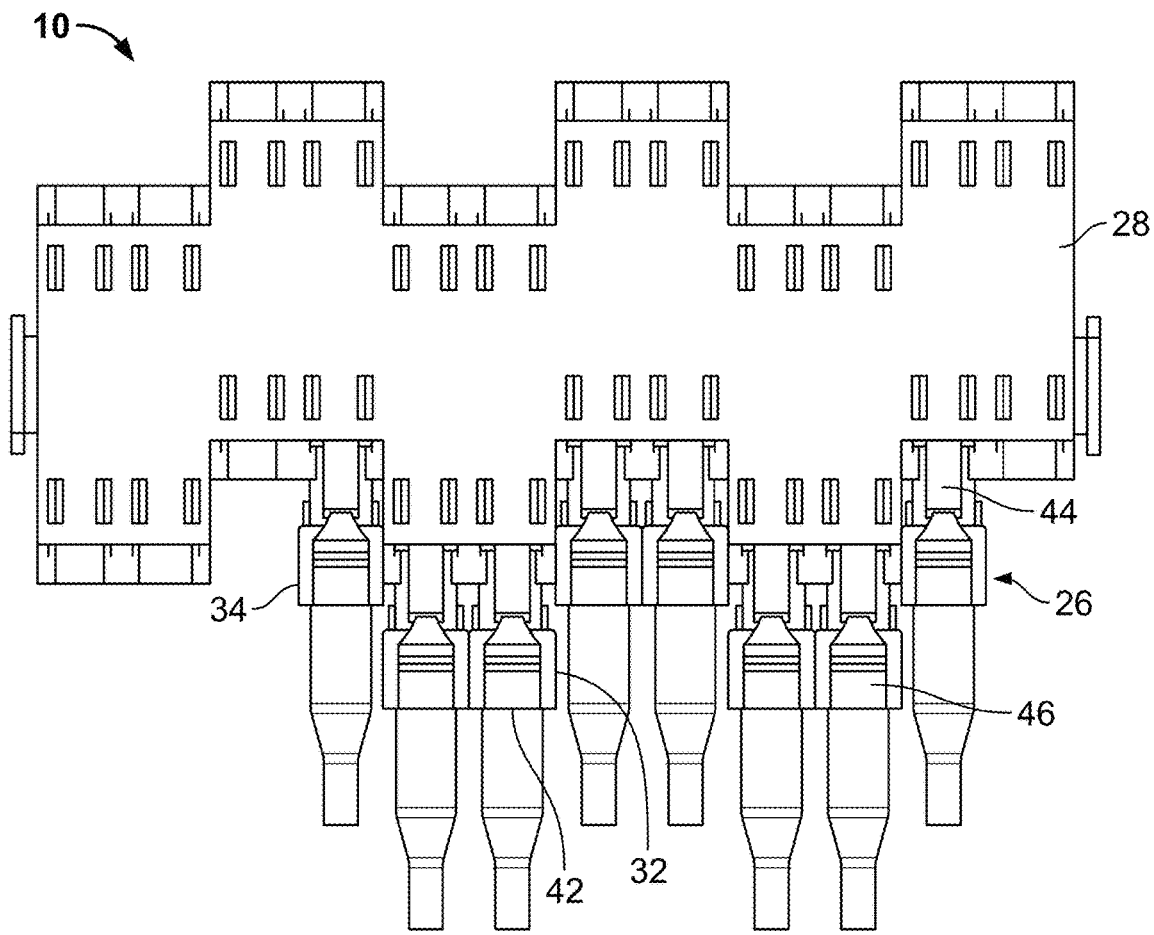
FIG. 9 is a top view of the adapter block of FIG. 8.
Figure 10:
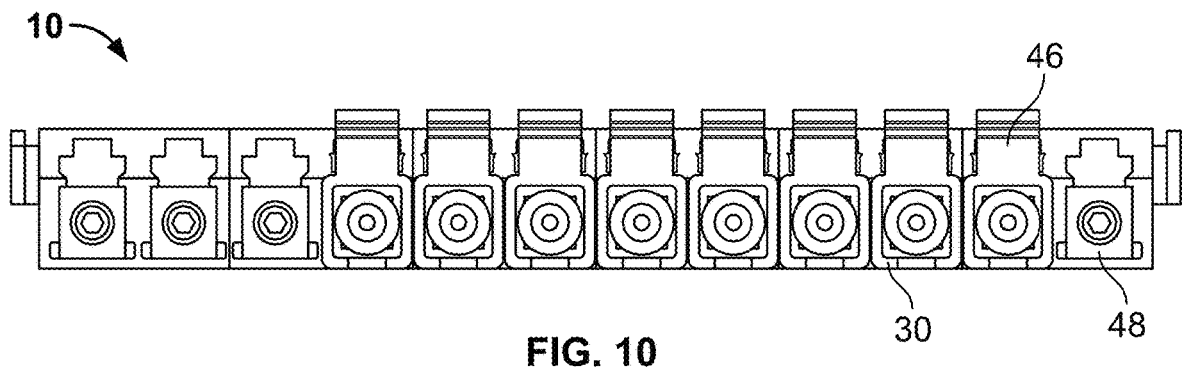
FIG. 10 is a front view of the adapter block of FIG. 8.

FIGS. 8-10 illustrate the fiber optic adapter block 10 with a number of LC-type fiber optic connectors 26 inserted within the individual adapters 24 of the block 10. LC-type connectors 26 and adapters 24 are generally known in the art. A fiber optic connector 26 having an LC footprint may define a connector body 30 having opposing sidewalls 32, 34, a top wall 36, a bottom wall 38, a front end 40, and a rear end 42. Certain portions of the connector body 30 may be formed from a molded polymeric material. The connector body 30 normally defines a latch 44 extending from the top wall 36 thereof toward the rear end 42, the latch 44 extending at an acute angle with respect to the top wall 36 of the connector body 30. An LC-type connector 26 may also include a latch trigger 46 that extends from the rear end 42 of the connector body 30 toward the front end 40. The latch trigger 46 also normally extends at an acute angle with respect to the top wall 36. The latch trigger 46 is configured to come into contact with the latch 44 for flexibly moving the latch 44 downwardly.

When an LC-type fiber optic connector 26 is placed in an adapter 24 for optically coupling light from two optical fibers together, the latch 44 functions to lock the fiber optic connector 26 in place within a cavity 48 of the adapter 24. As is known in the art, the latch 44 normally includes a pair of catches 50, each one extending from a side of the latch 44. Within each adapter cavity 48 is a pair of symmetrically disposed retaining shoulders 52, each formed by a horizontal surface 54 and a vertical surface 56. Please see FIG. 11 for an example of an LC-type fiber optic adapter cavity 48. The horizontal surface 54 of each shoulder 52 is configured to interact with a catch 50 of the latch 44 to deflect the latch 44 downwardly (i.e., toward the central axis of the connector 26). The vertical surface 56 of each shoulder 52 is configured to interact with a vertical surface 58 of a catch 50 to lock the fiber optic connector 26 within the adapter 24.

During insertion, the interaction between the catches 50 of the latch 44 and the horizontal surfaces 54 of the shoulders 52 cause the latch 44 to move downwardly. The latch 44 springs back (upwardly) after insertion is complete. Thereafter, the vertical surfaces 56 of the shoulders 52 interact with the vertical surfaces 58 on the catches 50 of the latch 44 to lock the connector 26 into the adapter 24.

Removal of the connector 26 is normally accomplished by manually depressing the latch 44 downwardly and pulling the connector 26 away from the adapter cavity 48. As noted above, the latch trigger 46 may be used to provide greater access the latch 44 and may be configured to come into contact with the latch 44 for flexibly moving the latch 44 downwardly. When the latch trigger 46 is depressed, the interaction between the latch trigger 46 and the latch 44 causes the latch 44 to be pressed in a downward direction, freeing the catch portions 50 of the latch 44 from the vertical surfaces 56 of the shoulders 52 in removing the connector 26.

Further details relating to LC-type adapters are described in U.S. Pat. No. 5,647,043, the entire disclosure of which is incorporated herein by reference.

As known, LC-type fiber optic adapters 24 may be provided as duplex adapters wherein each duplex adapter defines a pair of adapter cavities 48 positioned next to one another. Duplex clips may be provided on the connectors 26 for coupling two LC connectors 26 in a side-by-side configuration. A duplex clip may include a single larger latch trigger that expands over the individual latch triggers 46 of the connectors 26 for removing the two connectors 26 at the same time from a duplex LC adapter 24. An example of a duplex clip is shown and described in U.S. Pat. No. 6,672,898, the entire disclosure of which is incorporated herein by reference.

When connectors 26 having an LC footprint are mounted in adapter blocks that provide a high density of connections, a single LC connector 26 that is positioned next to another LC connector 26 or between two other LC connectors 26 may be difficult to access. A technician, when trying to remove a selected LC connector 26, may unintentionally disconnect more than one LC connector 26 at a time. This is a particular problem for rows of three or more connectors 26.

According to the inventive aspects of the present disclosure, the fiber optic adapter block 10 is molded such that every other adapter 24 (in the depicted embodiment, every other duplex adapter 24) is staggered in a front to back direction with respect to an adjacent adapter 24 as the adapters 24 extend widthwise from the right side 16 to the left side 18 of the block 10. Thus, as shown in FIGS. 1 and 3, the front ends 60 (also the rear ends 62) of the first, the third, and the fifth duplex adapters 24 from the left are aligned at a first depth $D_1$ along a front to back direction. Similarly, the front ends 60 (also the rear ends 62) of the second, the fourth, and the sixth duplex adapters from the left are aligned at a second depth $D_2$ along a front to back direction, wherein the second depth $D_2$ is different than the first depth $D_1$. According to the depicted embodiment, the second depth $D_2$ is farther back than the first depth $D_1$.

Figure 12:
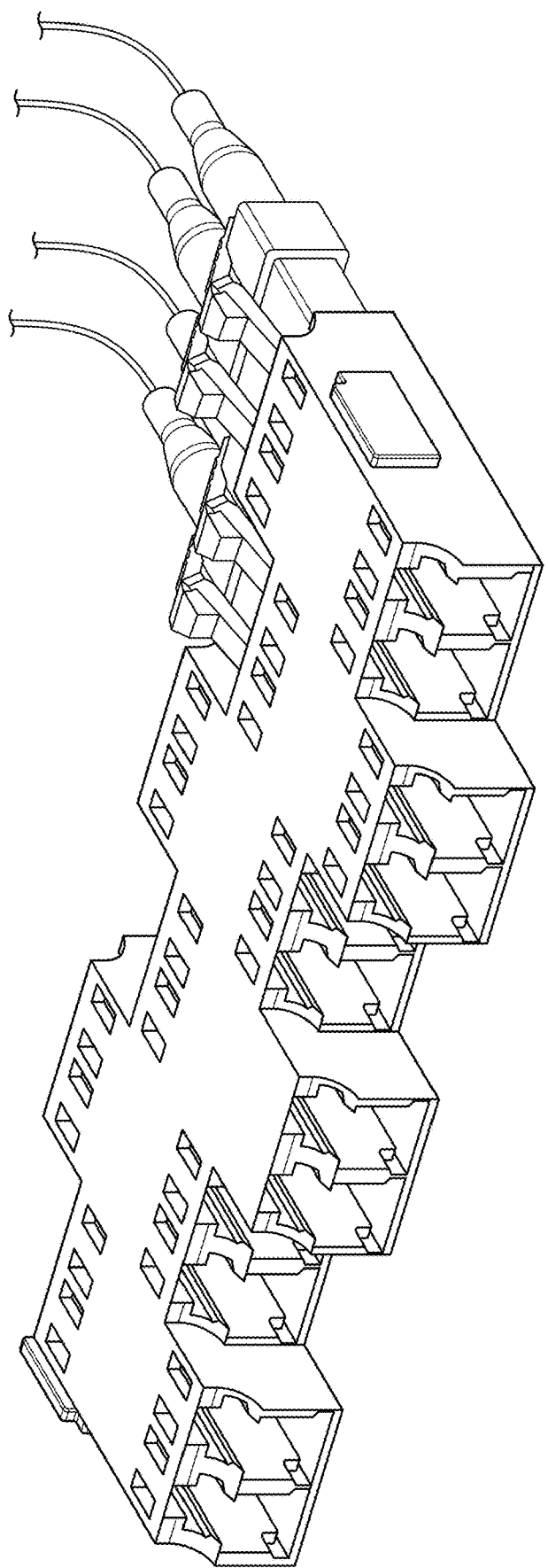
FIG. 12 illustrates a technician accessing one of the fiber optic connectors mounted on the adapter block of FIG. 1.
Figure 13:
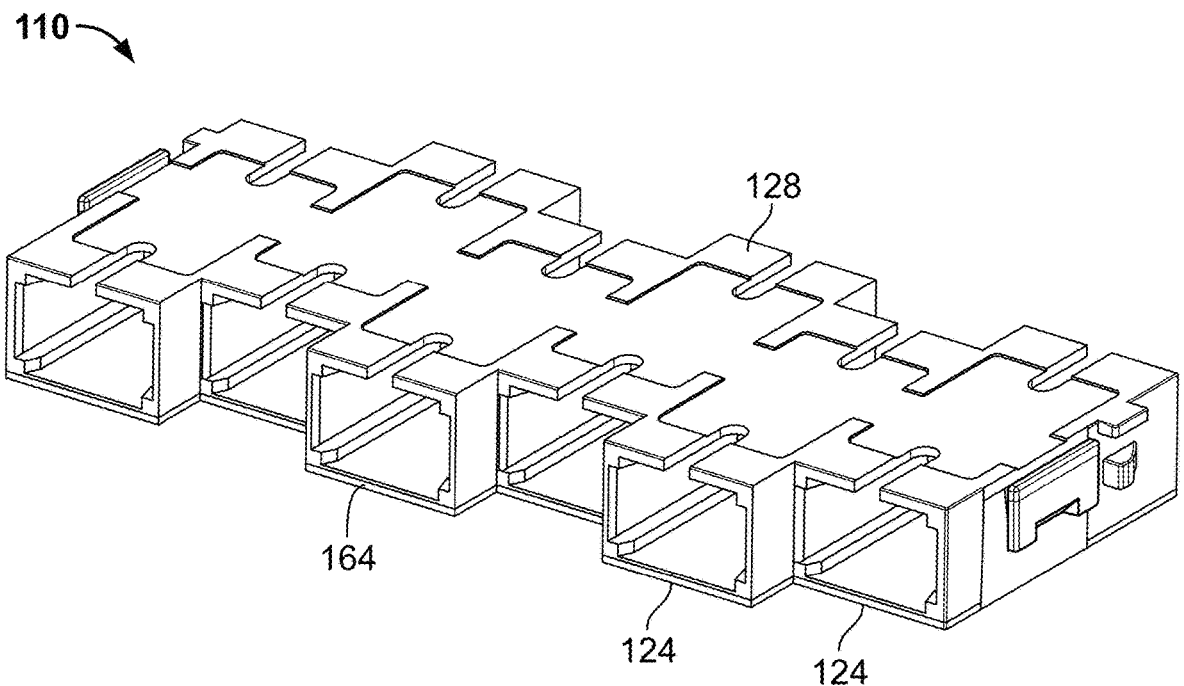
FIG. 13 is a front perspective view of another embodiment of an adapter block having features that are examples of inventive aspects in accordance with the present disclosure.
Figure 14:
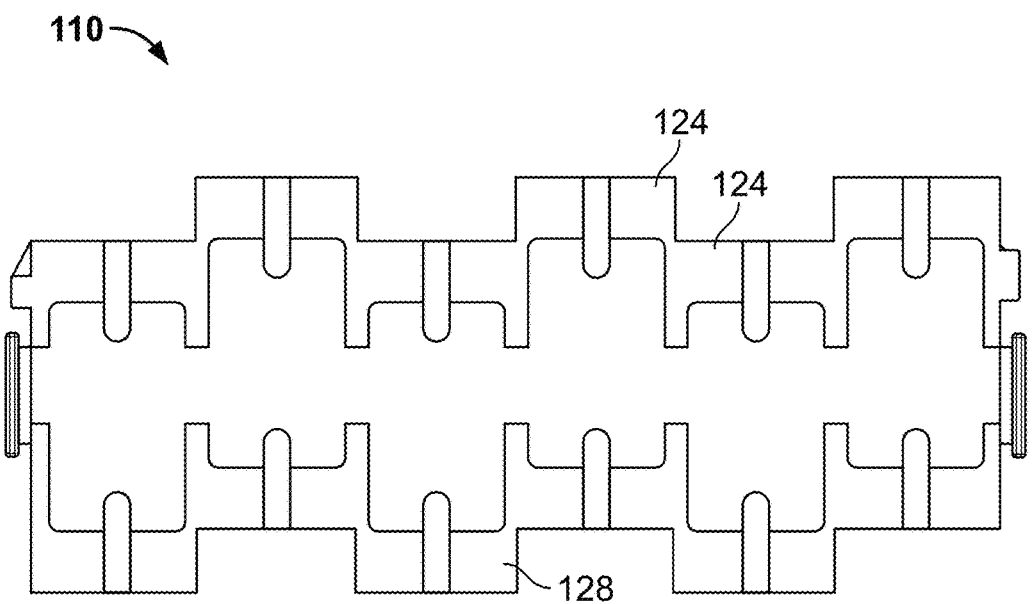
FIG. 14 is a top view of the adapter block of FIG. 13.
Figure 15:
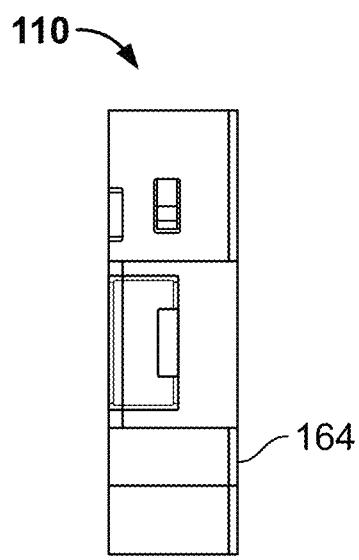
FIG. 15 is a right side view of the adapter block of FIG. 13.
Figure 16:
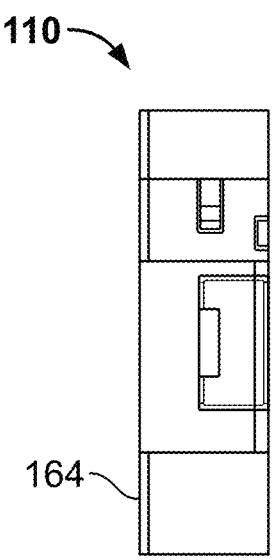
FIG. 16 is a left side view of the adapter block of FIG. 13.
Figure 17:
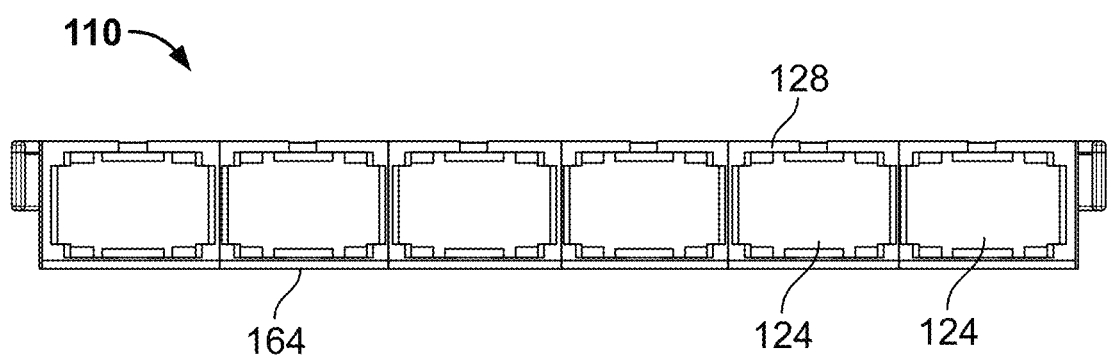
FIG. 17 is a front view of the adapter block of FIG. 13.

In this manner, a technician experiences reduced interference from adjacent connectors 26 when trying to access a connector 26 that is in the middle of two other connectors 26. According to the depicted embodiment, the adapter block 10 provides space on at least one side of the connector 26 to be removed and the technician can also use portions of the body 28 of the adapter block 10 for support in removing the connector 26. Please refer to FIG. 12 for an illustration of a technician accessing one of the fiber optic connectors 26 mounted to the adapter block 10 of the present disclosure. For example, in the block 10 shown in FIG. 1, if a technician wants to access the leftmost connector 26, the technician has ample room on the left side of the connector for removing the connector 26 by pushing the latch 44 and pulling away from the adapter block 10. The technician may also use the front left corner of the adapter block body 28 for support in removing the connector 26. If the technician wants to access the second connector 26 from the left, the technician has ample room on the right side of the connector for removing the connector 26 since the next adjacent connector 26 to the right is staggered rearwardly and is at a different depth. The technician is also able to use the front right corner of the first duplex adapter 24 for support in applying the pushing and pulling forces on the connector 26. If the technician wants to access the third connector 26 from the left (i.e., the first connector 26 of the second duplex adapter 24 from the left), the technician is able to use the right sidewall 64 of the first duplex adapter 24 from the left to limit interference from the connector 26 to the left of the connector 26 to be removed. The technician can also use the right sidewall 64 or the front right corner of the first duplex adapter 24 from the left for support in pulling the third connector 26. The same process is applicable to the rest of the connectors 26 on the block 10.

In this manner, when every other duplex adapter 24 is staggered front to back, ease of access to each connector 26 is improved and the unwanted removal of an adjacent connector is reduced. It should be noted that the configuration provided by the adapter block 10 of the present disclosure is different than an adapter block having a stepped configuration, wherein each adapter (or duplex adapter) includes a front end that is positioned at a farther point than the previous adapter in a row of adapters. The adapter block 10 of the present disclosure is able to provide high density, ease of access, and a small footprint for the adapter block, whereas a stepped configuration would either provide for a larger footprint or would require angled mounting of the adapter block to preserve a similar footprint.

It should be noted that although the depicted adapter block 10 has been described and shown as including six staggered duplex adapters 24, for a total of twelve single adapters 24 and twelve possible connections, the block 10 may include other numbers of adapters 24.

Although the adapters 24 of the block 10 have been described and shown as being integrally molded with respect to the block body 28, wherein the block 10 defines a unitary one-piece molded body 28, in other embodiments, the individual adapters 24 or the individual duplex adapters 24 may be provided as separable structures, wherein the adapters 24 could be individually mounted in a staggered configuration on a separate support structure. The individual adapters 24 may be permanently fixed to such a support structure (e.g., via ultrasonic welding) or may be mounted so as to be removable from the support structure.

Although the present disclosure includes the discussion of connectors and adapters having an LC-type footprint, the inventive aspects of the disclosure such as the staggered configuration of the adapters are equally applicable to adapters of other formats such as SC-type or LX.5-type adapters.

For example, FIGS. 13-17 illustrate a block 110 with adapters 124 having an SC-type footprint, wherein the block 110 includes similar features to that of block 10 in its general configuration. In the depicted embodiment, the adapter block 110 defines a generally one-piece unitary molded body 128, wherein the plurality of adapters 124 are again integrally formed with the one-piece body 128. In the depicted embodiment, the block 110 is shown to be formed from six SC-type adapters.

It should be noted that the individual adapters 124 forming the staggered configuration of the block 110 may include features found in conventional SC-type adapters. For example, each of the adapters 124 may include internal elements for coupling to SC-type fiber optic connector housings. The internal elements (not shown in the figures) may include a ferrule alignment sleeve and a pair of inner housing halves. As is known for conventional SC type adapters, the pair of inner housing halves may define a sleeve mount, wherein each inner housing half of the sleeve mount includes a pair of latching hooks for latching to an exterior of an SC connector housing and an axial bore for receiving the ferrule alignment sleeve.

The internal elements may be positioned into an adapter recess of each adapter 124 through an opening at the top sides of the adapters 124. The internal elements may be placed within the adapter recess in a manner similar to that shown in U.S. Pat. No. 5,317,663, issued May 20, 1993, the entire disclosure of which is incorporated herein by reference. Either a single panel 164 may be used to close all of the openings of the adapters 124 or each adapter 124 may include its own panel for closing the individual openings of the adapters 124 to secure the internal elements therewithin.

In an alternative embodiment, the internal elements may be molded integrally with the body 128 of the adapter block 110 as described in further detail in U.S. Application Publication No. 2010/0054668, the entire disclosure of which is incorporated herein by reference.

It should be noted that the adapter blocks 10/110 of the present disclosure can be configured to be mounted to a variety of different telecommunications equipment or fixtures. The adapter blocks 10/110 may be configured to be movably mounted or fixedly mounted with respect to such equipment or fixtures. The adapter blocks 10/110 may be provided within the telecommunications equipment or fixture as a modular unit that is removable, replaceable, or expandable.

Figure 11:
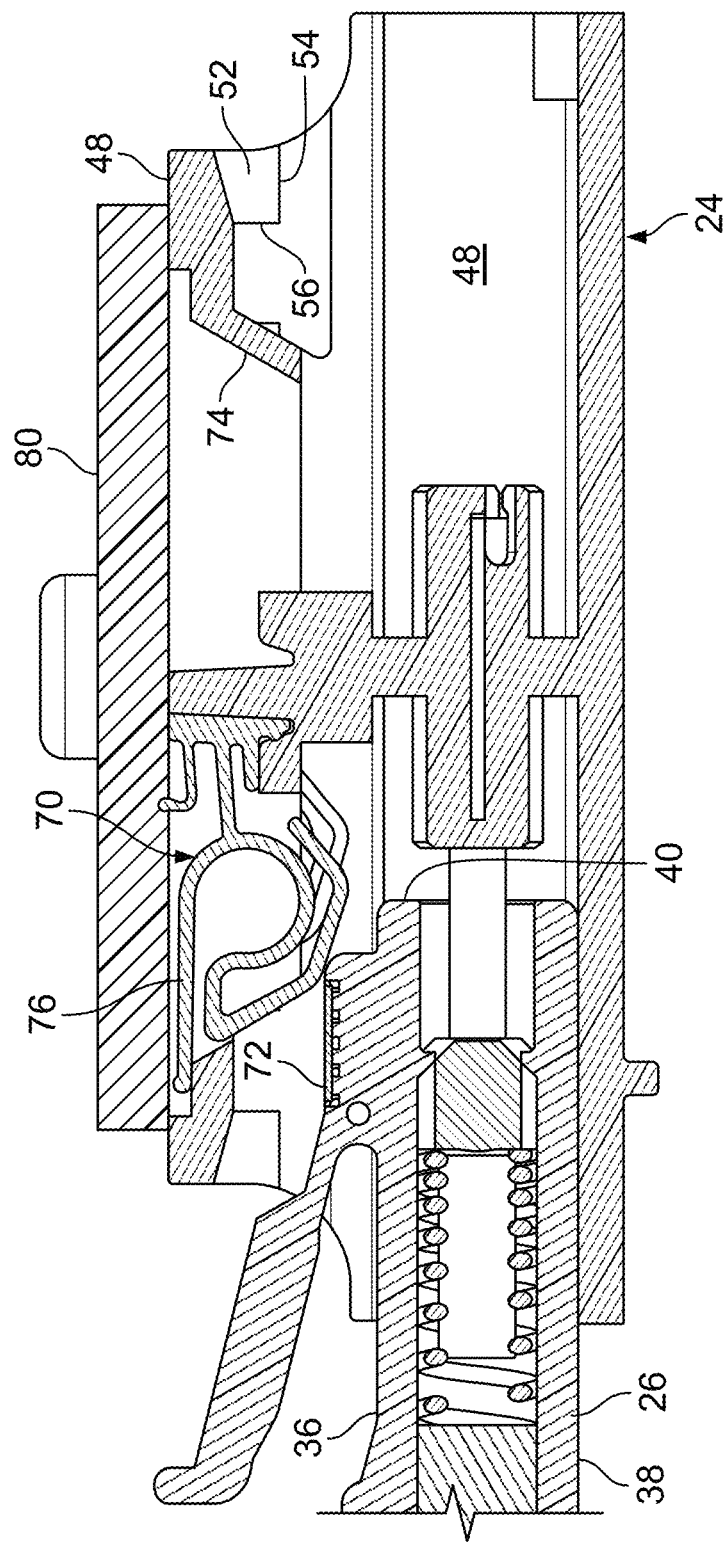
FIG. 11 is a cross-sectional view of an example adapter having a media reading interface configured to collect information stored in memory disposed on a fiber optic connector.

Further, in accordance with some aspects, one or more of the adapters 24 of the blocks 10/110 may be configured with media reading interfaces or circuitry 70 to collect data or information from one or more fiber optic connectors 26 received within the adapters 24, as described in further detail in U.S. Application Publication No. 2011/0262077, the entire disclosure of which is incorporated herein by reference. For example, as shown in FIG. 11 for an LC adapter block, one or more of the adapter cavities 28 may be configured to hold one or more media reading interfaces 70 that are configured to engage memory contacts 72 on the fiber optic connectors 26. One or more media reading interfaces 70 may be positioned in the body 28 that defines the adapter block 10. In certain implementations, the body 28 may define slots 74 extending between an exterior of the body and an internal adapter passage or cavity 48 in which the ferrules of the connectors 26 are received.

Certain types of media reading interfaces 70 include one or more contact members 76 that are positioned in the slots 74. As shown in FIG. 11, a portion of each contact member 76 extends into a respective one of the passages or cavities 48 to engage memory contacts 72 on a fiber optic connector 26. Another portion of each contact member 76 also extends out of the slot 74 to contact a circuit board 80. Telecommunications equipment or fixtures to which the adapter block 10 may be mounted may define conductive paths that are configured to connect the media reading interfaces of the adapter 24 with a master circuit board. The master circuit board may include or connect (e.g., over a network) to a processing unit that is configured to manage physical layer information obtained by the media reading interfaces.

As noted, example adapters having media reading interfaces and example fiber optic connectors having suitable memory storage and memory contacts are shown in further detail in U.S. Application Publication No. 2011/0262077, filed the entire disclosure of which is hereby incorporated herein by reference.

Although in the foregoing description, terms such as "top", "bottom", "front", "back", "right", "left", "upper", and "lower were used for ease of description and illustration, no restriction is intended by such use of the terms. The telecommunications devices described herein can be used in any orientation, depending upon the desired application.

The illustrated embodiment shows the connector axes at 90° to the longitudinal direction (right to left as described). The angle could be turned if desired, such as for cable management.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A fiber optic adapter assembly comprising:
at least three fiber optic adapters provided in a stacked arrangement extending widthwise in a longitudinal direction, wherein every other adapter of the at least three fiber optic adapters is staggered in a front-to-back direction with respect to an adjacent adapter such that front ends of the every other adapter of the at least three fiber optic adapters are aligned at a first depth and a front end of the adjacent adapter is at a second depth that is different than the first depth, wherein the fiber optic adapter assembly is configured such that the at least three fiber optic adapters all define parallel adapter axes and each adapter of the at least three fiber optic adapters at least partially overlaps with an adjacent adapter of the at least three fiber optic adapters when viewed along the longitudinal direction, and wherein each adapter of the at least three fiber optic adapters is non-movably mounted with respect to the rest of the adapters of the at least three fiber optic adapters.

2. A fiber optic adapter assembly according to claim 1, wherein rear ends of every other adapter of the at least three fiber optic adapters are aligned at a third depth and a rear end of the adjacent adapter is at a fourth depth that is different than the third depth.

3. A fiber optic adapter assembly according to claim 1, wherein the at least three adapters of the fiber optic adapter assembly are integrally formed as a unitary one-piece molded body to define a fiber optic adapter block.

4. A fiber optic adapter assembly according to claim 1, wherein the at least three fiber optic adapters are configured for interconnecting LC-type fiber optic connectors.

5. A fiber optic adapter assembly according to claim 4, wherein each fiber optic adapter of the at least three fiber optic adapters defines a duplex LC-type fiber optic adapter for providing a total of at least six connections.

6. A fiber optic adapter assembly according to claim 5, wherein the at least three fiber optic adapters includes at least six duplex LC-type fiber optic adapters for providing a total of at least twelve connections.

7. A fiber optic adapter assembly according to claim 1, wherein the at least three fiber optic adapters includes at least six fiber optic adapters.

8. A fiber optic adapter assembly according to claim 1, wherein the at least three fiber optic adapters are configured for interconnecting SC-type fiber optic connectors.

9. A fiber optic adapter assembly according to claim 1, wherein the parallel adapter axes of the at least three fiber optic adapters are perpendicular to a line defined along the longitudinal direction.

10. A fiber optic adapter assembly according to claim 1, wherein the parallel adapter axes are at a non-perpendicular angle with respect to a line defined along the longitudinal direction.

11. A fiber optic adapter assembly according to claim 1, wherein each adapter of the at least three fiber optic adapters is configured with circuitry defining a media reading interface for collecting data from one or more fiber optic connectors received within the adapter.

12. A fiber optic adapter assembly according to claim 11, wherein the media reading interface includes one or more electrical contact members extending into a passage of the adapter for engaging contacts of the one or more fiber optic connectors received within the adapter.

13. A fiber optic adapter assembly according to claim 1, wherein the fiber optic adapter assembly further defines a right side and a left side separated from the right side widthwise in the longitudinal direction defined by the assembly, each of the right side and the left side of the fiber optic adapter assembly including a first mounting structure configured for mounting the fiber optic adapter assembly to a piece of telecommunications equipment, the first mounting structure configured for slidably mounting the fiber optic adapter assembly to a piece of telecommunications equipment in a direction generally perpendicular to the longitudinal direction defined by the stacked arrangement of the fiber optic adapters.

14. A fiber optic adapter assembly according to claim 13, wherein the first mounting structure is also configured for slidably mounting the fiber optic adapter assembly to a piece of telecommunications equipment in a direction generally perpendicular to the adapter axes defined by the fiber optic adapters.

15. A fiber optic adapter assembly according to claim 14, wherein each of the right side and the left side of the fiber optic adapter assembly also includes a second mounting structure spaced apart from the first mounting structure, the second mounting structure being configured for allowing the fiber optic adapter assembly to be mounted to another piece of telecommunications equipment that is different than the piece of telecommunications equipment for which the first mounting structure is used, the second mounting structure configured for mounting the fiber optic adapter assembly to the other piece of telecommunications equipment in a direction generally parallel to the adapter axes defined by the fiber optic adapters.

16. A fiber optic adapter assembly according to claim 13, wherein the first mounting structure on each of the right and the left side of the fiber optic adapter assembly is dovetail-shaped and is defined by a larger flange portion and a narrower stem portion connecting the flange portion to a respective side of the fiber optic adapter assembly, wherein on each of the right side and the left side of the fiber optic adapter assembly, the narrower stem portion provides separation between the larger flange portion and the respective side of the adapter assembly such that the larger flange portion and the respective side of the adapter assembly cooperatively define slide surfaces configured to slidably contact mating surfaces on a piece of telecommunications equipment when slidably mounting the fiber optic adapter assembly to a piece of telecommunications equipment.

17. A fiber optic adapter assembly according to claim 13, wherein the at least three adapters of the fiber optic adapter assembly are integrally formed as a unitary one-piece molded body to define a fiber optic adapter block and wherein the first mounting structure at each of the right side and the left side is integrally formed with the fiber optic adapter block.

18. A fiber optic adapter assembly according to claim 15, wherein the second mounting structure defines a ramped surface.

\* \* \* \* \*